United States Patent
Sumiya et al.

[11] Patent Number: 6,030,595
[45] Date of Patent: *Feb. 29, 2000

[54] PROCESS FOR THE PRODUCTION OF SYNTHETIC DIAMOND

[75] Inventors: Hitoshi Sumiya; Shuichi Satoh; Yoshiki Nishibayashi, all of Itami, Japan

[73] Assignee: Sumitomo Electric Industries, Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/684,725

[22] Filed: Jul. 22, 1996

Related U.S. Application Data

[63] Continuation of application No. 08/319,575, Oct. 7, 1994, abandoned.

[30] Foreign Application Priority Data

| Oct. 8, 1993 | [JP] | Japan | 5-253210 |
| Oct. 27, 1993 | [JP] | Japan | 5-269040 |
| Jul. 21, 1994 | [JP] | Japan | 6-169154 |

[51] Int. Cl.[7] .................................................. B01J 3/06
[52] U.S. Cl. ................................................ 423/446
[58] Field of Search .......................... 423/446; 117/76; 501/86; 428/408

[56] References Cited

U.S. PATENT DOCUMENTS

| 4,125,770 | 11/1978 | Lang | 250/272 |
| 4,287,168 | 9/1981 | Wentorf, Jr. et al. | 423/446 |
| 4,301,134 | 11/1981 | Strong | 423/446 |
| 4,425,315 | 1/1984 | Tsuji et al. | 423/446 |
| 4,754,140 | 6/1988 | Nam et al. | 250/337 |
| 5,133,332 | 7/1992 | Tanaka et al. | 51/293 |
| 5,419,889 | 5/1995 | Matumoto et al. | 423/460 |

FOREIGN PATENT DOCUMENTS

| 0470623A1 | 2/1992 | European Pat. Off. . |
| 0525207A1 | 2/1993 | European Pat. Off. . |
| 0594994A2 | 5/1994 | European Pat. Off. . |

OTHER PUBLICATIONS

W. Wierzchowski et al., *Journal of Crystal Growth*, 114(1+2), 209–227 (1991), no month.

Y. Nishibayashi et al. Transactions of the 53rd Autumn Applied Physics Conference 1992, p. 408 (1992).

M. Yoshikawa et al., *Applied Physics Letters*, 62(24), 3114–3116 (1993), Jun.

*Primary Examiner*—Steven P. Griffin
*Assistant Examiner*—Stuart L. Hendrickson
*Attorney, Agent, or Firm*—Wenderoth, Lind & Ponack, L.L.P.

[57] ABSTRACT

A high purity synthetic diamond with less impurities, crystals defects, strains, etc. can be provided, in which the nitrogen content is at most 10 ppm, preferably at most 0.1 ppm and the boron content is at most 1 ppm, preferably at most 0.1 ppm or in which nitrogen atoms and boron atoms are contained in the crystal and the difference between the number of the nitrogen atoms and that of the boron atoms is at most $1\times10^{17}$ atoms/cm$^3$. The strain-free synthetic diamond can be produced by a process for the production of a strain-free synthetic diamond by the temperature gradient method, which comprises using a carbon source having a boron content of at most 10 ppm and a solvent metal having a boron content of at most 1 ppm and adding a nitrogen getter to the solvent metal, thereby synthesizing the diamond.

1 Claim, 3 Drawing Sheets

PROCESS FOR THE PRODUCTION OF SYNTHETIC DIAMOND

This application is a continuation of now abandoned application, Ser. No. 08/319,575, filed Oct. 7, 1994.

BACKGROUND OF THE INVENTION

1. Field of the Invention

This invention relates to a colorless, transparent, high purity and good crystallinity synthetic diamond substantially free from impurities, crystal defects, strains, etc., a process for the production of the same and a method of measuring the strain of diamond.

2. Description of the Prior Art

Diamond crystals can be applied to various uses such as heat sinks, dies for wire drawing, cutting tools for precision working, optical parts, laser windows and anvils for producing ultra-high pressures, because of having high hardness, high strength, excellent thermal conductivity, excellent corrosion resistance and good transmittance of lights.

Naturally occurring diamonds, most of which are called Ia type, contain about 1000 ppm of nitrogen. The nitrogen in this natural diamond is distributed in the crystal in an aggregated form, so that crystal defects and internal strains are large and there occurs absorption of light due to nitrogen in the infrared range. Depending upon the variety of a rough stone, there is a large dispersion. Thus, the applied use has been limited to heat sinks or tools. High purity natural diamond containing nitrogen impurity in an amount of at most several ppm is called IIa type and such diamond is so little as represented by, for example, an output of about 2% based on the whole rough stones. Since the natural diamond of IIa type contains very small amount of impurities, is colorless and transparent and has superior transmittance property, it has widely been applied to jewels, optical parts and laser window materials.

However, there remain defects or strains to a considerably great extent in the interior part of the natural diamond because of undergoing complicated growth progresses in the interior part of the earth. As to the strain, the natural diamond rather has it more than synthetic diamonds containing nitrogen. Furthermore, the natural diamond of IIa type has such a problem that the output quantity is small to result in a higher production cost and difficulty in obtaining.

An ordinary diamond artificially synthesized under an ultra-high pressure and high temperature is called type Ib and contains several hundreds ppm of nitrogen. Since this nitrogen is contained in the diamond crystal as an isolated substitutional impurity, the crystal is rendered yellow and less valuable for jewels. In addition, the concentration of nitrogen is largely different depending on the growth sectors and the nitrogen distribution is largely uneven in the interior part of the crystal, thus resulting in more strains in the crystal.

On the other hand, it is known that when a nitrogen getter such as Al is added to a solvent metal during synthesis of diamond, the nitrogen in the diamond can be removed to about several ppm to obtain diamond of IIa type. When the nitrogen getter is added to the solvent metal, however, inclusions in large amounts ordinarily tend to be taken in the crystal to largely decrease the production yield of a good quality crystal. Accordingly, the production cost of the synthetic diamond of IIa type is higher than that of the natural diamond of IIa type. Removal of nitrogen in the synthetic diamond is limited to about 1 ppm and the estimation of the diamond as a decorative article is approximately H to J by GIA scale (Japanese Patent Laid-Open Publication No. 88289/1977). Moreover, there is found an absorption due to nitrogen in the ultraviolet range.

As illustrated above, in the synthetic diamond of the prior art, a crystal hardly containing nitrogen and substantially free from inclusions or internal defects has not been known.

Furthermore, it is well known that an element such as Ti or Zr is used as a nitrogen getter. When using such an element as a nitrogen getter, nitrogen can effectively be removed, but carbides such as TiC, ZrC, etc. are formed in large amounts in a solvent and taken in a diamond crystal, so that a good quality diamond can hardly be obtained.

On the contrary, the inventors have succeeded in producing an inclusion-free synthetic diamond of IIa type having a nitrogen content of at most 0.1 ppm by using at least one element selected from Group IVa and Va elements having a high nitrogen removal efficiency as a nitrogen getter and simultaneously adding to a solvent metal a material capable of suppressing formation of a carbide of Group IVa element, a material capable of diffusing the carbide or a material capable of improving the activity of carbon in the solvent metal, so that inclusions are not taken in the crystal. However, several ppm of boron is still included in the crystal, so that there are found an absorption of light due to boron in the infrared range and some strains or defects in the crystal.

As described above, natural diamond has a number of defects or large strains in the interior part of the crystal. Natural diamond of IIa type contains less impurities, but is not good as to the crystallinity such as defects, strains, etc. Thus, the natural diamond of IIa type has a problem that it tends to be cracked during working and when applying to technical fields needing a strength as diamond, for example, an anvil for producing an ultra-high pressure, compression cell for FT-IR, laser window material, etc., it is readily broken in some case. Further, it cannot be applied to a field needing high crystallinity, for example, monochomaters, semiconductor substrates, etc.

On the other hand, a synthetic diamond of IIa type is much more excellent in crystallinity than natural diamond, but is not sufficient in other properties, for example, such problems arising that the working yield is low, the mechanical strength is lower than that of diamond itself and the synthetic diamond of IIa type cannot be applied to a field needing high crystallinity, for example, monochomaters, semiconductor substrates, etc.

The synthetic diamond crystal of IIa type of the prior art contains several ppm of boron and thus meets with an absorption of light due to boron in the infrared range, thus resulting in a problem on the application to optical parts. In addition, there are some defects or strains in the crystal.

That is, in the synthesis of diamond by the temperature gradient method, diamond is used as a carbon source, but a commercially available diamond powder contains 10 to 1000 ppm of boron and natural diamond powder conatins several tens to several hundreds ppm of boron with a large dispersion. In the synthesis of diamond using such a carbon source, several ppm to ten and several ppm of boron is contained to give blue color. Accordingly, there occurs an absorption due to boron in the infrared range and ultraviolet to visible range, which is not preferable as an optical part. The concentration of boron is largely different depending on the growth sectors and the boron distribution is largely uneven in the interior part of the crystal. This is considered to be one reason for which the crystallinity is not good.

Measurement of the strain of diamond has hitherto been carried out by visual measurement using a polarizing microscope, but this method is not so precise in the quantitative respect.

There has been proposed a method of measuring the strain of diamond using Si (004) or Ge (004) commonly used as a first crystal in the double crystal X-ray diffraction method, but since the crystal interplanar spacing thereof used for the diffraction is not the same as diamond, the FWHM of a rocking curve is largely broadened (e.g. about 60 arcseconds) and this method does not lead to a precise and quantitative estimation of strain.

Under the situation, the present invention aims at providing a high purity synthetic diamond with less impurities, crystal defects, strains, etc., a process for the production of the same and a method of measuring the strain of the synthetic diamond.

As illustrated above, when boron is substantially completely removed, a colorless, transparent and defect- or strain-free crystal is obtained, but for this purpose, it is required to use very high purity raw materials of a carbon source and solvent and there arises a problem on the supply and cost of raw materials.

SUMMARY OF THE INVENTION

It is an object of the present invention to provide a high purity synthetic diamond with less impurities, crystal defects, strains, etc., whereby the disadvantages of the prior art can be overcome.

It is another object of the present invention to provide a process for the production of a colorless, transparent, high purity and good crystallinity synthetic diamond substantially free from impurities, crystal defects, strains, etc.

It is a further object of the present invention to provide a method of measuring the strain of a synthetic diamond.

These objects can be attained by a strain-free synthetic diamond, characterized in that the nitrogen content is at most 10 ppm and the boron content is at most 1 ppm, a synthetic diamond, characterized in that nitrogen atoms and boron atoms are contained in the crystal and the difference between the number of the nitrogen atoms and that of the boron atoms is at most $1 \times 10^{17}$ atoms/cm$^3$, a process for the production of a strain-free synthetic diamond by the temperature gradient method, characterized by using a carbon source having a boron content of at most 10 ppm and a solvent metal having a boron content of at most 1 ppm and adding a nitrogen getter to the solvent metal, followed by synthesis of diamond and a method of measuring the strain of a synthetic diamond, characterized by measuring the rocking curve by the double crystal method using, as a first crystal, a diamond crystal having a same diffraction angle within 10 arcseconds as the Bragg angle of a diffraction face of a diamond crystal used for the measurement and estimating the strain in the synthetic diamond based on the FWHM (full width at half maximum).

BRIEF DESCRIPTION OF THE DRAWINGS

The accompanying drawings are to illustrate the principle and merits of the present invention in detail.

DETAILED DESCRIPTION OF THE INVENTION

Figure 1:
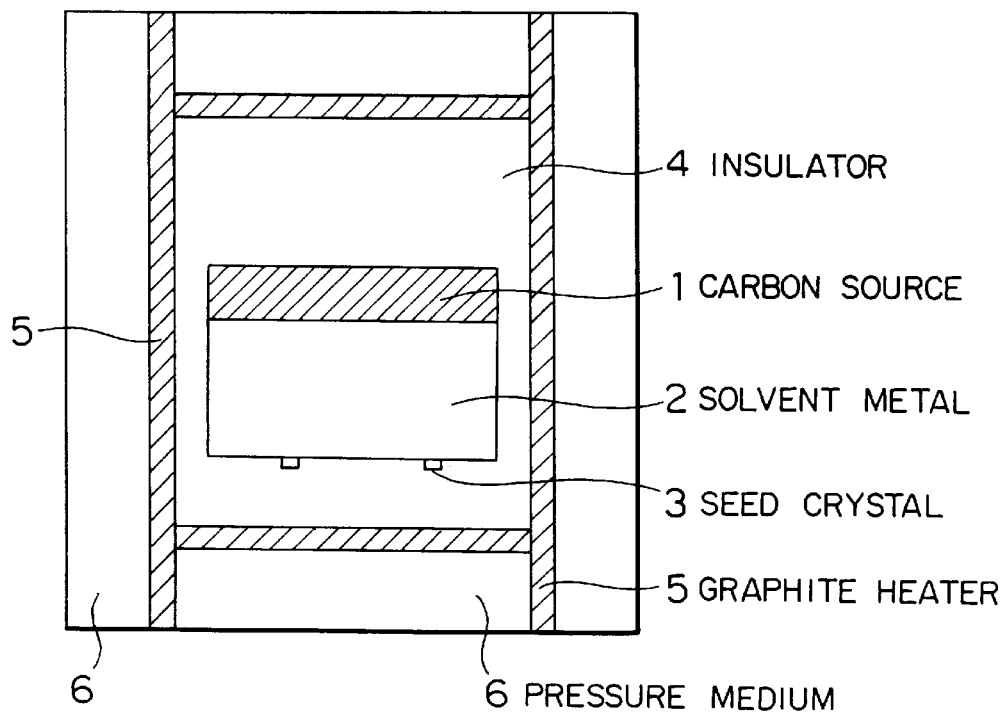
FIG. 1 is a schematic view of the structure of a sample chamber for the synthesis of a diamond crystal as one embodiment of the present invention.

The present invention is developed to solve the above described problems and thus provides (1) a strain-free synthetic diamond, characterized in that the nitrogen content is at most 10 ppm, preferably at most 0.1 ppm, and the boron content is at most 1 ppm, preferably at most 0.1 ppm, (2) a strain-free synthetic diamond, characterized in that in the X-ray diffraction by the double crystal method, diamond crystal is used as a first crystal and the FWHM of the X-ray diffraction rocking curve is at most 10 arcseconds, preferably at most 6 arcseconds in the case of measuring by CuKα ray with an arrangement in parallel to (004) plane, and (3) a strain-free synthetic diamond, characterized in that the FWHM of a peak at 1332 to 1333 cm$^{-1}$ in the Raman spectrum of diamond, measured by means of an apparatus for Raman spectroscopic analysis with a resolving power of at most 1 cm$^{-1}$ is at most 2.3 cm$^{-1}$, preferably at most 2 cm$^{-1}$. Furthermore, the present invention relates to strain-free synthetic diamonds consisting of at least two combinations of the above described features (1) to (3). Herein, the unit of FWHM of the X-ray diffraction rocking curve; and arcseconds is used as a measure for indicating the completeness of crystallinity. The theoretical value of FWHM of the X-ray diffraction rocking curve a complete crystal is in the range of 4.1 arcseconds.

In addition, the present invention also provides a process for the production of a strain-free synthetic diamond, which is characterized in that in a process for the synthesis of diamond single crystal by the temperature gradient method, a carbon source having a boron content of at most 10 ppm and a solvent metal having a boron content of at most 1 ppm are used and a nitrogen getter is added to the solvent metal, thereby synthesizing a strain-free diamond having at least one of the above described features (1) to (3).

In the present invention, in particular, it is preferable to use, as the above described carbon source, a graphite subjected to a halogenizing treatment to remove boron to a boron content of at most 1 ppm. In the present invention, in particular, the above described nitrogen getter is preferably at least one member selected from the group consisting of Group IVa and Va elements of Periodic Table. In the present invention, in particular, the above described solvent metal is preferably one to which an element is added capable of preventing formation of a carbide of at least one member selected from the group consisting of Group IVa and Va elements of Periodic Table. In the present invention, in particular, it is preferable to arrange a buffer material for stabilizing the initial growth of the crystal between the above described solvent metal and seed surface.

In a particularly preferable embodiment of the present invention, diamond is synthesized at an ultra-high pressure and high temperature by the temperature gradient method and when the temperature and pressure at a sample section are lowered to normal temperature and pressure, the lowering of the pressure is completed at a temperature of 300 to 1000° C. in the sample section.

Furthermore, the present invention provides methods of measuring the strain of a synthetic diamond. The first method is characterized by measuring the X-ray diffraction rocking curve thereof using diamond crystal as a first crystal and based on the FWHM thereof, estimating the strain in the synthetic diamond. The second method is characterized by measuring the X-ray diffraction rocking curve thereof by the quadruple crystal method using Si, Ge or diamond crystal and based on the FWHM thereof, estimating the strain in the synthetic diamond. The third method is characterized by measuring the peak at 1332 $cm^{-1}$ to 1333 $cm^{-1}$ of the Raman spectrum and based on the FWHM thereof, estimating the strain in the synthetic diamond.

In order to solve the above described problems, the inventors have estimated the crystallinity of various diamonds by various means. During studies therefor, an X-ray diffraction method has been developed using, as a first crystal, a very high purity, strain-free synthetic diamond developed by the inventos. According to this method, a very precise and quantitative measurement of strain can be carried out. Thus, the inventors have attained such a new knowledge that the strain in a diamond crystal can precisely and quantitatively be estimated by the FWHM of an X-ray diffraction rocking curve measured by the use of a diamond crystal as the first crystal, by the FWHM of an X-ray diffraction rocking curve measured by the quadruple crystal method or by the FWHM of a peak at peak at 1332 to 1333 $cm^{-1}$ in the Raman spectrum.

As a result of these procedures, it is found that there are more strains in natural diamonds of Ia type and IIa type and much less strains in synthetic diamonds as compared with the natural diamonds. However, it is found that even in the case of the synthetic diamonds, there are more strains in those containing some or more of nitrogen or boron, and when the synthetic diamonds contain at most 0.1 ppm of impurities, strains are hardly found in the diamond crystal. That is, it is further found that strains are hardly found in the crystal when in the double crystal X-ray diffraction method, diamond crystal is used as a first crystal and the FWHM of the X-ray diffraction rocking curve is at most 6 arcseconds in the case of measuring by CuK α ray with an arrangement in parallel to (004) plane, or when the FWHM of a peak at 1332 to 1333 $cm^{-1}$ in the above described Raman spectrum is at most 2 $cm^{-1}$.

In the production process of the present invention, for the purpose of reducing internal defects or strains in a crystal, boron impurities in raw materials or solvent metal are decreased to such an extent as little as possible and 0.1 to 5% by weight of a nitrogen getter is added to the weight of the solvent metal to adjust the nitrogen content and boron content in the crystal respectively to at most 0.1 ppm. As the solvent metal, for example, there are used metals such as Fe, Co, Ni, Mn, Cr, etc. and alloys thereof. As the nitrogen getter, there is used a material having a reactivity with nitrogen without hindering the growth of a diamond crystal, for example, at least one metal selected from the group consisting of Group IVa and Va metals of Periodic Table, such as Ti, Zr, Hf, V, Nb, Ta, etc., and alloys of these metals. As the carbon source of the present invention, there is preferably used a high purity diamond powder having a boron content of at most 10 ppm, more preferably a high purity graphite subjected to a halogenizing treatment to substantially remove boron. The use of the latter is more effective.

At the same time, it is effective to add an element capable of preventing formation of a carbide of an element selected from Group IVa and Va elements of Periodic Table, for example, Cu, Ag, Au, Zn, Cd, etc. in a proportion of 0.1 to 20% by weight to the solvent metal.

Moreover, it is very effective to arrange a buffer material consisting of an element selected from the group consisting of Al, Ni, Cu, Zn, Ga, Ag, Cd, In, Sn, Au, Ti and Pb, for example, a thin sheet of Al or Cu with a thickness of 0.01 to 0.5 mm, between the surface of a seed and solvent metal for the purpose of stabilizing the initial growing state of a diamond crystal.

The strain due to incorporation of inclusions and the crystalline defects or strains due to unstable growth at the initial crystal growth can be reduced by employing these methods or means.

In the technical field for the synthesis of diamond by the temperature gradient method, it is more preferable to release the pressure at an internal temperature of 300 to 1000° C., preferably 400 to 800° C., more preferably 500 to 600° C. after synthesizing diamond under the commonly used ultra-high pressure and high temperature, so that strain due to stress is not retained in the crystal.

Furthermore, the present invention provides (4) a synthetic diamond, characterized in that nitrogen atoms and boron atoms are contained in the crystal and the difference between the number of the nitrogen atoms and that of the boron atoms is at most $1\times10^{17}$ atoms/$cm^3$ and (5) a synthetic diamond, characterized in that nitrogen atoms and boron atoms are contained in the crystal and the difference between the number of the nitrogen atoms and that of the boron atoms is at most $1\times10^{16}$ atoms/$cm^3$.

In addition, the present invention also provides a process for the production of the above described synthetic diamond (4) or (5), which is characterized in that in a process for the synthesis of diamond single crystal by the temperature gradient method, the amount of a nitrogen getter to be added to a solvent or the amount of boron to be added to a carbon source or solvent is controlled so that the amount of nitrogen and that of boron taken in the crystal during the synthesis be substantially the same by the number of atoms.

The inventors have made various efforts to solve the above described problems and consequently, have found that blueing of diamond crystal and lowering of the crystallinity thereof due to the presence of boron impurities from raw materials can be compensated by retaining nitrogen to some extent in the diamond crystal. Thus, the inventors have attained a colorless and transparent diamond which contains boron and nitrogen, but which is free from optical absorption of boron or nitrogen by controlling the amount of nitrogen removed, and a process for the production of the same. According to the present invention, it is found that the strain in the crystal due to boron is moderated and the crystallinity is improved.

When using a nitrogen getter such as Al, moreover, it is difficult to substantially completely remove nitrogen in diamond. It is found in this case, however, that when boron is added to the crystal in a substantially similar amount to the amount of nitrogen which has not been removed and has been retained, a colorless and transparent diamond which contains boron and nitrogen, but which is free from optical absorption of boron or nitrogen is obtained. It is further found that the strain in the crystal due to nitrogen is moderated and the crystallinity is improved.

This will now be illustrated in greater detail. When the synthesis is carried out in an Fe—Al type solvent, the reaction of Al (Al+N=AlN) is not strong, but the removal efficiency of nitrogen is low. In contrast, when adding Ti to a solvent, high quality and high purity diamond substantially free from inclusions can be synthesized when the nitrogen content is at most about 0.1 ppm. In a diamond synthesized by using a Ti getter, however, absorption of boron (content about 0.2 ppm) appears in the infrared or near infrared range, which does not appear in the case of an Al getter. It is assumed from this fact that absorption due to nitrogen and boron will disappear because boron acting as a p-type semiconductor (acceptor) and nitrogen acting as a n-type semiconductor (donor) form AD pair during synthesis of a crystal and are electrically neutralized. That is, it is considered that in the case of the synthesis with the Al getter having a low nitrogen removal effect, nitrogen is well electrically neutralized with boron taken in the crystal to reduce the absorption, whilst in the case of using a nitrogen getter, nitrogen is substantially completely removed and only an absorption due to the boron taken in the crystal appears. In order to confirm this effect, a synthesis was tried by positively adding boron under such a condition that nitrogen remains in a relatively large amount. Consequently, an absorption (at 4.6 eV) of nitrogen of Ib type in the ultraviolet range is largely reduced in the sector (111) enriched in boron.

Experiments and Results

① Diamond Synthesis by Addition of Boron

To an Fe-type metal solvent are added Al in an amount of 0.83 atomic % and boron in variable amounts, i.e. of 15, 30 and 50 ppm. Synthesis of Diamond single crystal is carried out by an epitaxial growth on a seed crystal according to the temperature gradient method under synthetic conditions of a pressure of 5.5 GPa and a temperature of 135° C. A high purity raw material containing no boron is used in the synthesis. Above all, a crystal synthesized by adding 30 ppm of boron is most colorless and transparent and accordingly, polishing is carried out in such a manner that the plane (110) be an observing plane.

② Observation of Crystal Cross-section

Figure 2:
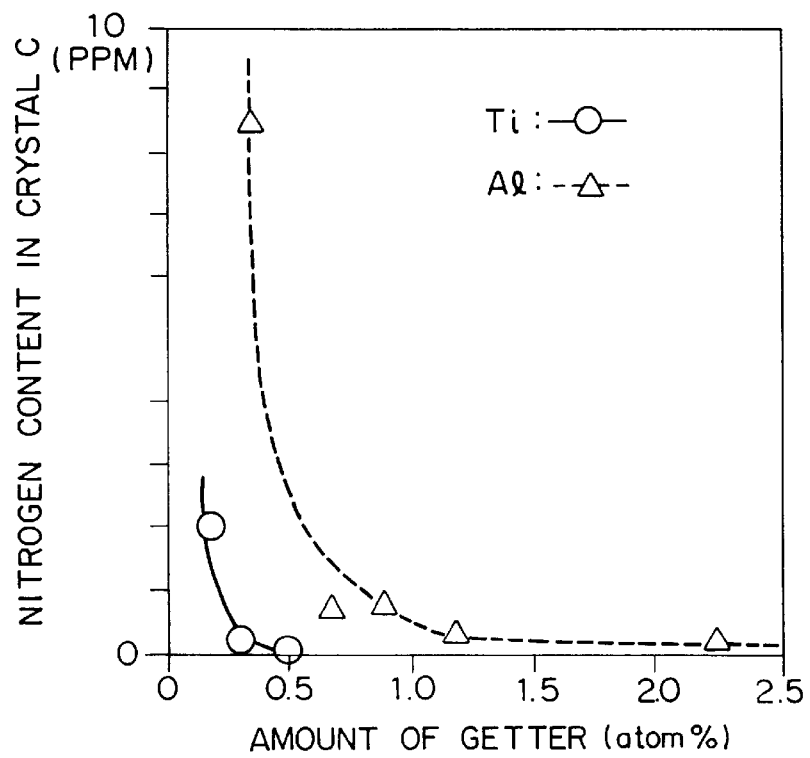
FIG. 2 is a graph showing the relationship between the amount of Ti or Al getter added and the nitrogen content in the crystal.
Figure 3:
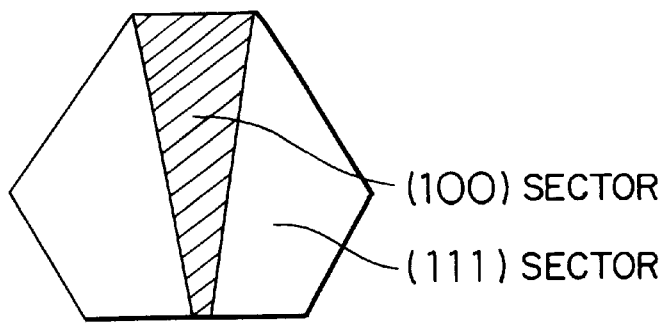
FIG. 3 is a schematic view of illustrating the cross-section of a crystal.
Figure 4:
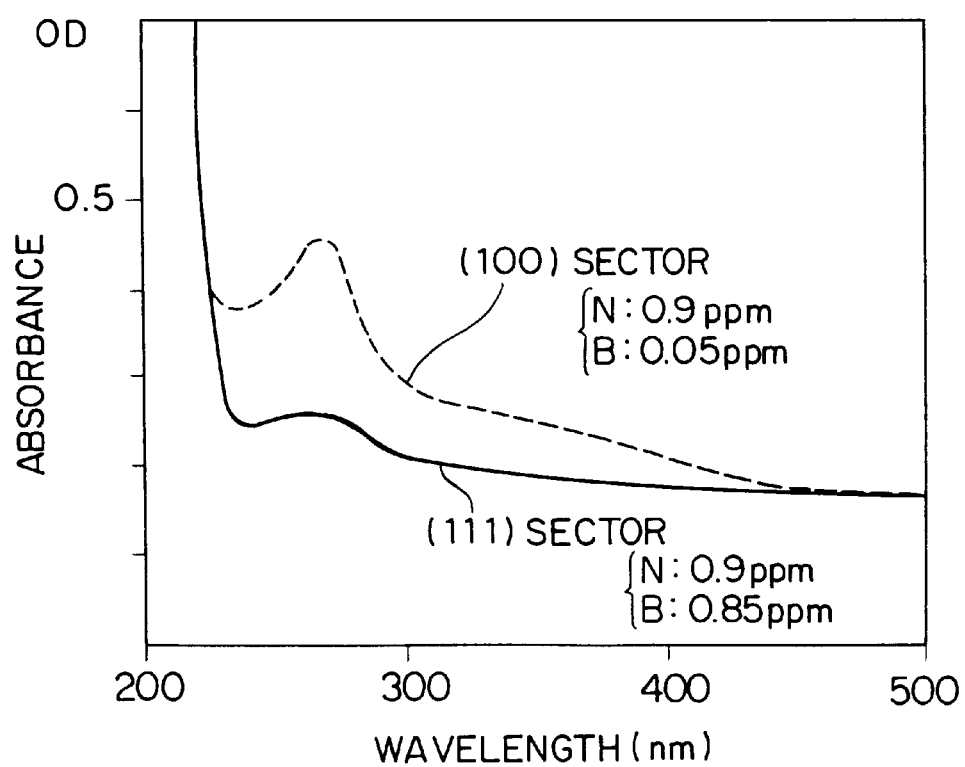
FIG. 4 is a graph showing the relationship between the boron content and nitrogen-presumed content in the sector (111) and sector (100) and the absorption spectrum of ultraviolet to visible in the each sector.

FIG. 3 shows a schematic view of a crystal cross-section and FIG. 4 shows the boron content and estimated nitrogen content in each sector. The boron content is measured by comparison of a sample by SIMS with a previously prepared standard sample whose boron content is clarified by the ion implantation method. The nitrogen content is estimated from the graph of FIG. 2 showing the relationship between the amount of Ti or Al getter added and the nitrogen content in the crystal. In FIG. 2, the abscissa shows the amount of a getter added (atomic percent) and the ordinate shows the nitrogen content (ppm) in the crystal. ○=Ti, △=Al.

Furthermore, the ultraviolet-visible absorption spectra in Sector (111) and Sector (100) are measured to obtain results as shown in FIG. 4. In Sector (111), in which boron and nitrogen are contained in substantially equimolar amounts, absorption of nitrogen of Ib type (at 4.6 eV) markedly small to give an absorption of IIa type. In Sector (100), in which boron is hardly contained, absorption of nitrogen of Ib type appears. The both show IIa type in the absorption in the infrared range.

③ Consideration

It is assumed that AD pair is formed since in the sector, in which boron and nitrogen are contained in substantially equimolar amounts, absorption of nitrogen of Ib type dissolved in the isolated dispersion type is decreased, as described above.

In the present invention, it is desired that the number of nitrogen and boron atoms contained in diamond crystal are substantially the same. If the difference between the number of both the atoms is at most $1 \times 10^{17}$ atoms/cm$^3$, a diamond crystal whose strains are more reduced as compared with natural diamond and synthetic diamond of Ib type of the prior art will be obtained. That is, there can be obtained a diamond crystal having more excellent crystallinity than that of the prior art, in which the FWHM of the X-ray diffraction rocking curve is at most 10 arcseconds, measured by an arrangement of a first crystal in parallel to (004) plane of diamond, or the FWHM of a peak at 1332 cm$^{-1}$ to 1333 cm$^{-1}$ in the Raman spectrum is at most 2.3 cm$^{-1}$. For example, seven to ten crystals are respectively prepared as to natural diamond of IIa type, natural diamond of Ia type and synthetic diamond of Ib type of the prior art and subjected to the above described measurements to obtain respectively rocking curve FWHM of 300 to 3000 arcseconds, 200 to 600 arcseconds and 15 to 30 arcseconds, and FWHM of a peak at 1332 cm$^{-1}$ to 1333 cm$^{-1}$ in the Raman spectrum of 2.15 to 3.5 cm$^{-1}$, 2.8 to 3.3 cm$^{-1}$ and 2.4 to 2.6 cm$^{-1}$.

Furthermore, it is more preferable to use a diamond crystal such that the difference between the number of nitrogen atoms and boron atoms is at most $10^{16}$ atoms/cm$^3$ so as to give improved crystallinity. In this case, the diamond has such a good crystallinity that the FWHM of the X-ray diffraction rocking curve is at most 7 arcseconds, measured by an arrangement of a first crystal in parallel to (004) plane of diamond, or the FWHM of a peak at 1332 cm$^{-1}$ to 1333 cm$^{-1}$ in the Raman spectrum is at most 2 cm$^{-1}$ and can thus be applied to uses needing high grade crystallinity, for example, monochromators, semiconductor substrates, etc. In this case, this diamond can also be applied to various optical parts or window materials because of being from absorption of light by impurities such as nitrogen, boron, etc. exclusive of the absorption by the diamond itself in the near ultraviolet to far infrared range and applied to uses for jewels because of being a colorless and highly transparent diamond crystal. In this case, the color grade of the diamond crystal is at least G color by GIA scale, corresponding to the highest level as an estimation of the diamond for jewels. It will clearly be understood how the diamond of the present invention is excellent from the fact that the well-known synthetic diamond of IIa type is of middle class represented by H to J in the same estimation (Japanese Patent Laid-Open Publication No. 88289/1977).

Synthesis of the diamond as described above is carried out by controlling the amount of a nitrogen getter to be added to a solvent so that the amounts of nitrogen and boron taken in the crystal are approximately same by the number of the atoms, or controlling the amount of boron to be added to a carbon source or solvent. Specifically, the following procedures are employed.

(1) The amount of a nitrogen getter added is controlled in such a manner that nitrogen is retained in the crystal in substantially the same amount as the amount of boron which is contained, as an impurity, in a carbon source and solvent raw material and taken in the diamond crystal.

(2) A nitrogen getter is added to such an extent that the crystal growth of diamond is not hindered and boron or a boron compound is previously added to a carbon source or solvent so that boron is taken in the diamond crystal in substantially the same amount as that of nitrogen retained during the same time.

A suitable procedure can be selected from these procedures considering the varieties of the carbon source or solvent (boron content), the nitrogen removal efficiency of the nitrogen getter, the degree of hindering the crystal growth of the nitrogen getter, etc.

As the nitrogen getter added to the solvent in the present invention, there can be used Al or Group IVa or Group Va elements such as Ti, Zr, Hf, V, Nb, Ta, etc. In the case of using Group IVa or Group Va elements as the nitrogen getter, it is preferable to add a material capable of suppressing formation of carbides of these elements. For example, at least one element selected from Al, Ni, Cu, Zn, Ga, Ag, Cd, In, Sn, Au, Tl and Pb is added, as such a material, in a proportion of 0.1 to 20 weight % to the solvent metal. The following experiment is carried out based on this knowledge.

(a) Experiment

Ti and Cu were added to a metallic solvent and maintained at a pressure of 5.5 GPa and a temperature of 1300 to 1400° C. for several tens hours in the temperature gradient method, thus growing a diamond crystal of 1 to 2 carats. The metallic inclusion of the solvent or other inclusions contained in the resulting crystal were observed by a microscope. When this crystal was polished in a thickness of 1 mm and subjected to measurement of the ultraviolet absorp tion spectrum, the amount of nitrogen was estimated by absorption at 4.6 eV.

(b) Results and Consideration

When Ti was only added to a metallic solvent, large amounts of inclusions were contained in the crystal, i.e. large amounts of impurities of ten and several μm were contained in addition to the inclusion of the metallic solvent and a good quality diamond crystal was hardly obtained. When the cross-section of the metallic solvent was observed after the synthesis, foreign matters of several μm to ten and several μm were found, which was found to be TiC as a result of analysis by EPMA. It is assumed that fine impurities in the diamond crystal consist predominantly of TiC taken in the diamond crystal. The inclusion of the metal solvent in a large amount is probably due to formation of TiC in a large amount in the metal solvent, whereby supply of carbon is hindered.

When Ti and further Cu are added, TiC observed in the solvent is size-reduced to 1 μm or less and the amount thereof is largely decreased, resulting in decrease of the inclusions in the diamond crystal. It is assumed that TiC is decompsed or the formation of TiC is suppressed by the addition of Cu.

Figure 5:
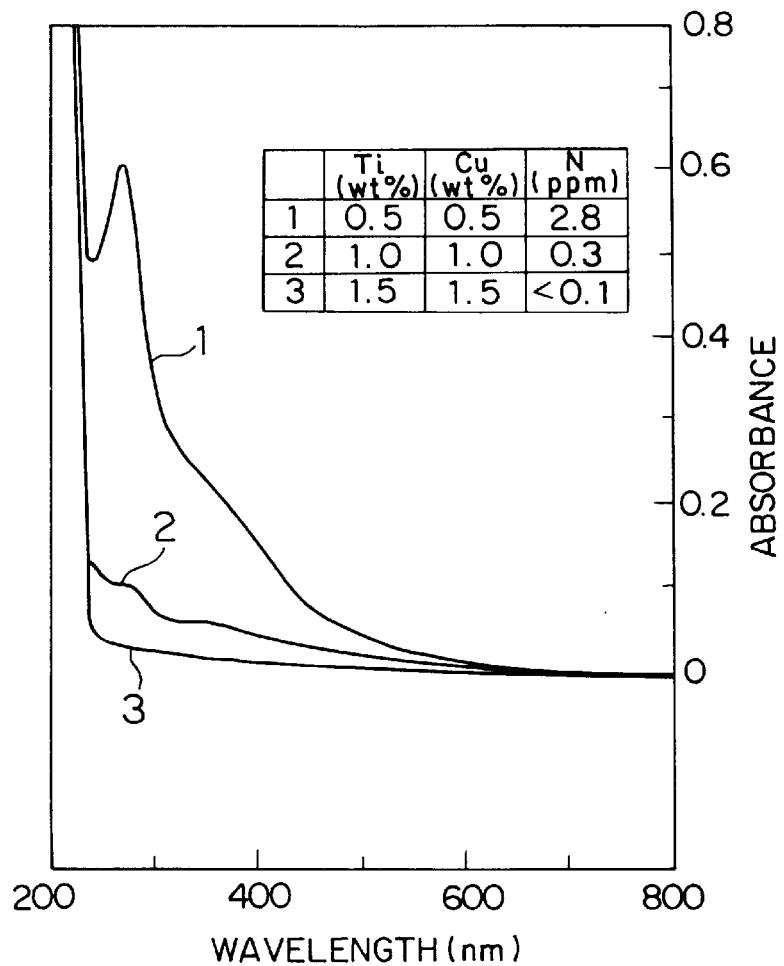
FIG. 5 is ultraviolet absorption spectra of diamond crystals synthesized by changing the amounts of Ti and Cu.
Figure 6:
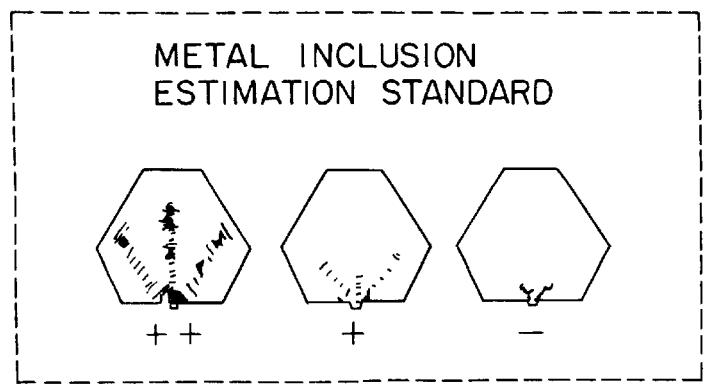
FIG. 6 is an estimation standard for the estimation (++, +, −) of metal inclusions in Table 1.

Table 1 shows results of typical synthetic experiments. When Ti is added in an amount of at least 1.5%, nitrogen is substantially completely removed and even when Cu is added in an amount of 1 to 3%, this state is not changed. FIG. 5 shows ultraviolet absorption spectra of diamond crystals synthesized with changing the amount of Ti an Cu added and when adding 1.5% of Ti, the absorption by nitrogen is hardly found. The addition of Cu in substantially the same amount as the amount of Ti results in large reduction of the inclusion of the solvent and incorporation of fine impurities, whereby a good quality diamond crystal can be obtained in stable manner. The standard (++, +, −) of estimation of the metal inclusion in Table 1 is shown in FIG. 6.

TABLE 1

| Added Amount (wt %) | | In Diamond Crystal | | |
|---|---|---|---|---|
| | | N Content | Inclusions | |
| Ti | Cu | (ppm) | Metal | Fine Impurities |
| 0.5 | 0.5 | 2.8 | − | − |
| 1.0 | — | 0.3 | ++ | ++ |
| 1.0 | 1.0 | 0.3 | − | − |
| 1.5 | — | less than 0.1 | ++ | + |
| 1.5 | 1.5 | less than 0.1 | − | − |
| 2.0 | — | less than 0.1 | +++ | ++ |
| 2.0 | 3.0 | less than 0.1 | + | − |

In the production process according to the present invention, for example, Fe, Co, Ni, Mn, Cr, etc. or alloys of these metals are generally used as the solvent metal. As the carbon source in the present invention, there can be used synthetic or natural diamond powders and graphite powders or moldings thereof. As the seed crystal, small crystals of synthetic or natural diamond are used.

In the present invention, furthermore, it is effective for the purpose of stabilizing the initial growth state of a crystal to arrange a buffer material consisting of at least one element selected from Al, Ni, Cu, Zn, Ga, Ag, Cd, In, Sn, Au, Tl and Pb, for example, Al plate or Cu plate between the surface of a seed and a solvent during synthesis of diamond. The plate thickness of the buffer material is generally in the range of about 0.01 to 0.5 mm. Thus, crystal defects or strains in the crystal due to unstable growth at the initial period of crystal growth can be reduced.

The strains due to incorporation of the inclusions or the crystal defects or strains in the crystal due to unstable growth at the initial period of crystal growth can be reduced by employing these procedures.

In the present invention, when diamond is synthesized at the commonly used ultra-high pressure and high temperature in the technical field of synthesizing diamond by the temperature gradient method and thereafter, the temperature and pressure at a sample section are lowered to normal temperature and pressure, the pressure is preferably released at an internal temperature of 300 to 1000 ° C., preferably 400 to 800° C., more preferably 500 to 600° C., whereby to reduce remaining of strains due to stress in the crystal.

Preferred embodiments of the present invention are summarized below:

(1) The process for the production of a strain-free synthetic diamond, wherein the nitrogen getter is added to the solvent in a proportion of 0.1 to 5 weight %.

(2) The process for the production of a strain-free synthetic diamond, wherein the solvent metal is selected from the group consisting of Fe, Co, Ni, Mn and Cr and alloys thereof.

(3) The process for the production of a strain-free synthetic diamond, wherein the above described embodiments (1) and (2) are combined.

(4) The process for the production of a strain-free synthetic diamond, wherein the element for suppressing formation of a carbide of an element selected from the group consisting of Group IVa and Group Va elements of Periodic Table is added to the solvent metal in a proportion of 0.1 to 20 weight %.

(5) The process for the production of a strain-free synthetic diamond, as described in the embodiment (4), wherein the element for suppressing formation of a carbide of an element selected from the group consisting of Group IVa and Group Va elements of Periodic Table is selected from Cu, Ag, Au, Zn and Cd.

(6) The process for the production of a strain-free synthetic diamond, wherein the buffer material is a thin plate consisting of an element selected from the group consisting of Al, Ni, Cu, Zn, Ga, Ag, Cd, In, Sn, Au, Ti and Pb.

(7) The process for the production of a strain-free synthetic diamond, as described in the embodiment (6), wherein the thin plate has a thickness of 0.01 to 0.5 mm.

(8) The process for the production of a strain-free synthetic diamond, wherein the above described embodiments (4) to (7) are combined.

(9) The process for the production of a strain-free synthetic diamond, wherein the release of the pressure is completed at a temperature of 500 to 600° C.

Advantages of the Invention

As illustrated above, the synthetic diamond of the present invention has less impurities, strains and crystal defects and reduced disadvantages such as cracking or breakage during compressing, and can be used as a diamond anvil for producing an ultra-high pressure or diamond anvil for FT-IR with a largely improved service life and stability. The synthetic diamond of the present invention can also be applied to uses needing high crystallinity of diamond, for example, monochromators, window materials for radiation light or radiation beam, semiconductor substrates, etc.

In addition, the synthetic diamond of the present invention contains nitrogen and boron as impurities, but the contents of the both are substantially the same and compensated with each other, so the synthetic diamond of the present invention meets with no absorption of light due to nitrogen and boron and little strain in the crystal in an analogous manner to high purity diamond of IIa type hardly containing impurities. Thus, the synthetic diamond of the present invention having disadvantages such as cracking or breakage reduced during compressing can be used as a diamond anvil for producing an ultra-high pressure or diamond anvil for FT-IR with a largely improved service life and stability. According to the present invention, diamond having very high crystallinity and light transmission property can be synthesized, which can be applied to uses such as monochromators, semiconductor substrates, jewels, etc.

The above described high quality synthetic diamond can be realized by the production process of the present invention. Moreover, according to the method of measuring the strain of the synthetic diamond of the present invention, a more precise and quantitative measurement of strain than in the prior art is rendered possible. This is very advantageous.

On the other hand, complete removal of nitrogen and boron has been considered very difficult in the prior art, but according to the production process of the present invention, a diamond crystal having substantially the same degree of light transmission property and crystallinity as high purity natural diamond of IIa type can readily be synthesized by the simple method comprising controlling the amounts of a nitrogen getter and boron to be added even under such a state that nitrogen and boron remain to some extent in the crystal. Therefore, the present invention is very advantageous in the progress of the industry.

EXAMPLES

The following examples are given in order to illustrate the present invention in greater detail without limiting the same.

Example 1

In FIG. 1 is shown the structure of a sample chamber for the synthesis of diamond, used in Examples and Comparative Examples. As a carbon source 1, there was used synthetic diamond powder having a boron content of 3 ppm and as a solvent metal 2, there was used Fe and Co having a boron content of at most 1 ppm with a solvent metal composition of Fe/Co=60/40 (weight ratio). To this solvent metal were added 1.5 weight % of Ti as a nitrogen getter (based on the weight of the solvent metal) and 1 weight % of Cu (based on the weight of the solvent metal). As a seed crystal 3, there was used a diamond crystal with a size of 500 $\mu$m. The carbon source 1 and seed crystal 3 were set in a graphite heater 5 to give a temperature gradient of about 30 ° C. and maintained at a pressure of 5.5 GPa and a temperature of 1300° C. for 70 hours in an ultra-high pressure producing apparatus to grow diamond on the seed crystal.

Then, the temperature was lowered to room tempeature and the pressure was reduced to take out a synthetic diamond. Consequently, there was obtained a colorless, transparent and good quality diamond crystal of IIa type, substantially free from inclusions, with 0.7 to 0.9 carat, which had a nitrogen content in the crystal of at most 0.1 ppm, measured by ESR. When the spectra of ultraviolet, visible and infrared were measured, other absorptions by nitrogen and boron were not found than that of the diamond itself. Observation of the resulting diamond by a polarizing microscope to observe a polarized light image and to estimate the strains tell that there was hardly found strain. The FWHM of the X-ray diffraction rocking curve was 5.8 arcseconds in the case of measuring using CuK$\alpha$ ray by the double crystal method with an arrangement in parallel to (004) plane of a synthetic diamond crystal as a first crystal. The FWHM of a peak at 1332 cm$^{-1}$ to 1333 cm$^{-1}$ in the Raman spectrum of diamond, measured by means of an apparatus for double monochromator Raman spectroscopic analysis with a resolving power of 0.5 cm$^{-1}$, was 1.8 cm$^{-1}$.

Examples 2 to 4 and Comparative Example 1

As the carbon source 1, a synthetic diamond powder containing 23 ppm of boron was used and the amounts of Ti and Cu added to the solvent metal (based on the weight of the solvent metal) were changed as described below:

Example 2: Ti 1.5 weight %, Cu 2 weight %
Example 3: Ti 1.0 weight %, Cu 1 weight %
Example 4: Ti 0.5 weight %, Cu 1 weight %
Comparative Example 1: no addition of Ti and Cu Diamond crystals were synthesized in the similar manner to Example 1 but changing the amounts of Ti and Cu as described above. Four kinds of the thus resulting crystals, six natural diamond crystals of Ia type and six natural diamond crystals of Ia type were respectively subjected to measurement and estimation of nitrogen impurity, boron impurity, the FWHM of rocking curve, the FWHM of Raman peak and the strains by observation of polarized light images in an analogous manner to Example 1. The results are shown in Table 1 with the results of Example 1.

TABLE 2

| Sample No. | FWHM of X-ray Diffraction Rocking Curve (arcsec) | FWHM of Raman Spectrum of 1332 to 1333 cmn$^{-1}$ Peak (cmc$^{-1}$) | Amount of Strains by Polarized Image | Amounts of N and B Impurities | |
|---|---|---|---|---|---|
| | | | | N | B |
| Example 1 | 5.8 | 1.8 | no | <0.1 ppm | <0.1 ppm |
| Example 2 | 6.1 | 2.1 | little | <0.1 ppm | ca. 1 ppm |
| Example 3 | 7.2 | 2.3 | little | ca. 1 ppm | ca. 1 ppm |
| Example 4 | 8.3 | 2.3 | little | ca. 10 ppm | ca. 1 ppm |
| Comparison Example 1 | 20 | 2.5 | somewhat much | ca. 80 ppm | ca. 1 ppm |
| Natural Ia | 200~600 | 2.8~8.3 | much | ca. 1000 ppm | |
| Natural IIa | 300~3000 | 2.2~3.5 | much | <1 ppm | <1 ppm |

Example 5

Diamond of IIa type was synthesized in an analogous manner to Example 1 except that an Al plate with a thickness of 0.05 mm, as a buffer material for stabilizing the initial crystal growth, was arranged between the solvent metal and seed crystal. Consequently, the crystallinity of the resulting diamond was further improved as represented by the fact that the FWHM of rocking curve was 5.6 arcsec. and the FWHM of Raman spectrum peak was 1.6 cm$^{-1}$.

Example 6

Diamond of IIa type was synthesized in an analogous manner to Example 1 except that after the synthesis of diamond, lowering of the temperature and reduction of the pressure were simultaneously carried out and the lowering of the pressure was completed when the internal temperature was 500° C. Consequently, the crystallinity of the resulting diamond was further improved as represented by the fact that the FWHM of rocking curve was 5.7 arcsec. and the FWHM of Raman spectrum peak was 1.6 cm$^{-1}$.

In the above described Examples and Comparative Examples, (004) plane of diamond was used as a first crystal in X-ray diffraction and arranged in parallel, but in the method of measuring the strains by X-ray diffraction, another plane, for example, (111) plane of diamond can be used and it is also effective to arrange it otherwise, for example, in asymmetric manner.

Example 7

In FIG. 1 is shown the structure of a sample chamber for the synthesis of diamond, used in Examples. As a carbon source 1, there was used synthetic diamond powder having a B (boron) content of 11 ppm and as a solvent metal 2, there was used Fe and Co having a B content of about 2 ppm with a solvent metal composition of Fe/Co=60/40 (weight ratio). To this solvent metal were added 0.8 weight % of Ti as a nitrogen getter and simultaneously, 1 weight % of Cu. As a seed crystal 3, there was used a diamond crystal with a size of 500 μm. The carbon source 1 and seed crystal 3 were set in a graphite heater 5 to give a temperature gradient of about 30° C. between them and maintained at a pressure of 5.5 GPa and a temperature of 1300° C. for 70 hours in an ultra-high pressure producing apparatus to grow diamond on the seed crystal.

Then, the temperature was lowered to room tempeature and the pressure was reduced to take out a synthetic diamond. Consequently, there was obtained a diamond crystal of IIa type, with 0.7 to 0.9 carat. The nitrogen and boron in the crystal were subjected to quantitative analysis to obtain $1.5 \times 10^{17}$ atoms/cm$^3$ and $1.5 \times 10^{17}$ atoms/cm$^3$ by SIMS.

Observation of the resulting diamond by a polarizing microscope to observe a polarized light image and to estimate the strains taught that there was found a considerably small amount of strains. The FWHM of the X-ray diffraction rocking curve was 7.0 arcseconds in the case of measuring by the double crystal method with an arrangement in parallel to (004) plane of a synthetic diamond crystal as a first crystal. The FWHM of a peak at 1332 cm$^{-1}$ to 1333 cm$^{-1}$ in the Raman spectrum, measured by means of an apparatus for double monochromator Raman spectroscopic analysis was 2.2 cm$^{-1}$.

Example 8

Diamond was synthesized in an analogous manner to Example 7 except changing the amounts of Ti and Cu added respectively to 1.5 weight % and 1.5 weight %. The resulting diamond was a blueish crystal which contained nitrogen and boron respectively in amounts of $1.0 \times 10^{16}$ atoms/cm$^3$ and $1.2 \times 10^{17}$ atoms/cm$^3$ by SIMS analysis. Measurement of the infrared absorption spectrum told that absorption by boron was found in the vicinity of 2800 cm$^{-1}$. Observation of the resulting diamond by a polarizing microscope to observe a polarized light image and to estimate the strains taught that there was found a small amount of strains. The FWHM of the X-ray diffraction rocking curve was 8.3 arcseconds in the case of measuring by the double crystal method with an arrangement in parallel to (004) plane of a synthetic diamond crystal as a first crystal. The FWHM of a peak at 1332 cm$^{-1}$ to 1333 cm$^{-1}$ in the Raman spectrum, measured by means of an apparatus for double monochromator Raman spectroscopic analysis was 2.5 cm$^{-1}$.

Example 9

Diamond was synthesized in an analogous manner to Example 7 except adding 0.04 weight % (based on carbon source) of boron to the carbon source, 1.5 weight % of Al as a nitrogen getter and no copper. Consequently, there was obtained a diamond crystal of IIa type, with 0.7 to 0.9 carat. The nitrogen and boron in the crystal were subjected to quantitative analysis by SIMS to obtain $1.8 \times 10^{17}$ atoms/cm$^3$ and $1.5 \times 10^{17}$ atoms/cm$^3$ by SIMS.

Observation of the resulting diamond by a polarizing microscope to observe a polarized light image and to estimate the strains taught that there was found a considerably small amount of strains. The FWHM of the X-ray diffraction rocking curve was 7.2 arcseconds in the case of measuring by the double crystal method with an arrangement in parallel to (004) plane of a synthetic diamond crystal as a first crystal. The FWHM of a peak at 1332 cm$^{-1}$ to 1333 cm$^{-1}$ in the Raman spectrum, measured by means of an apparatus for double monochromator Raman spectroscopic analysis, was 2.2 cm$^{-1}$.

Example 10

Diamond was synthesized in an analogous manner to Example 9 except changing the amount of Al to 0.5 weight %. The resulting diamond was a somewhat yellowish crystal which contained nitrogen and boron respectively in amounts of $1.6 \times 10^{16}$ atoms/cm$^3$ and $1.5 \times 10^{17}$ atoms/cm$^3$ by SIMS analysis. Measurement of the infrared absorption spectrum and ultraviolet-visible spectrum as to the resulting diamond told that in any case, absorption of nitrogen was found.

Observation of the resulting diamond by a polarizing microscope to observe a polarized light image and to estimate the strains taught that there was found a relatively small amount of strains. The FWHM of the X-ray diffraction rocking curve was 8.5 arcseconds in the case of measuring by the double crystal method with an arrangement in parallel to (004) plane of a synthetic diamond crystal as a first crystal. The FWHM of a peak at 1332 cm$^{-1}$ to 1333 cm$^{-1}$ in the Ramanspectrum, measured by means of an apparatus for double monochromator Raman spectroscopic analysis was 2.5 cm$^{-1}$.

Example 11

As a carbon source 1, there was used synthetic diamond powder having a B (boron) content of 7 ppm and as a solvent metal 2, there was used Fe and Co having a B content of about 1 ppm with a solvent metal composition of Fe/Co= 60/40 (weight ratio). To this solvent metal were added 1.5 weight % of Ti as a nitrogen getter and simultaneously, 1.5 weight % of Cu. As a seed crystal 3, there was used a diamond crystal with a size of 500 μm. The other procedures were rendered similar to those of Example 7 to synthesize diamond of IIa type.

Consequently, there was obtained a colorless, transparent and good quality diamond crystal of IIa type, with 0.7 to 0.9 carat. The nitrogen and boron in the crystal were subjected to quantitative analysis by SIMS to obtain $1.1 \times 10^{16}$ atoms/cm$^3$ and $1.8 \times 10^{18}$ atoms/cm$^3$.

Observation of the resulting diamond by a polarizing microscope to observe a polarized light image and to estimate the strains taught that there was hardly found strains in the crystal. The FWHM of the X-ray diffraction rocking curve was 5.8 arcseconds in the case of measuring by the double crystal method with an arrangement in parallel to (004) plane of a synthetic diamond crystal as a first crystal. The FWHM of a peak at 1332 to 1333 cm$^{-1}$ in the Ramanspectrum, measured by means of an apparatus for double monochromator Raman spectroscopic analysis was 1.8 cm$^{-1}$. Thus, this was found to be a diamond crystal very excellent in crystallinity. Measurement of the ultraviolet-visible spectrum and infrared spectrum thereof gave the result that no absorption of light was found due to the impurities such as nitrogen and boron. According to the expert's evaluation of the color grade as a gem diamond, it was F color based on GIA scale, which is a grade corresponding to the highest grade of natural high purity diamond.

Example 12

Diamond of IIa type was synthesized in an analogous manner to Example 11 except that an Al plate with a thickness of 0.05 mm, as a buffer material for stabilizing the initial crystal growth, was arranged between the solvent metal and seed crystal. Consequently, the crystallinity of the resulting diamond was further improved as represented by the fact that the FWHM of rocking curve was 5.7 arcsec. and the FWHM of Raman spectrum peak was 1.6 cm$^{-1}$. The other properties were same as those of Example 11.

Example 13

Diamond of IIa type was synthesized in an analogous manner to Example 11 except that after the synthesis of diamond, lowering of the temperature and reduction of the pressure were simultaneously carried out and the lowering of the pressure was completed when the internal temperature was 500° C. Consequently, the crystallinity of the resulting diamond was further improved as represented by the fact that the FWHM of rocking curve was 5.7 arcsec. and the FWHM of Raman spectrum peak was 1.6 cm$^{-1}$. The other properties were same as those of Example 11.

What is claimed is:

1. A method for the production of a strain-free synthetic diamond single crystal by the temperature gradient method, said diamond having a Raman spectrum peak of 1332 to 1333 cm$^{-1}$, the FWHM of which peak, when measured by means of an apparatus for Raman spectroscopic analysis with a resolving power of at most 1 cm$^{-1}$, is at most 2 cm$^{-1}$, and having an X-ray diffraction rocking curve, the FWHM of which is at most 6 arcseconds, and in which nitrogen atoms and boron atoms are contained in the crystal and the difference between the number of the nitrogen atoms and that of the boron atoms is at most $1 \times 10^{17}$ atoms/cm$^3$, and wherein the nitrogen content is at most 10 ppm and the boron content is at most 1 ppm and wherein there is employed in said method a carbon source having a boron content of at most 10 ppm and a solvent metal having a boron content of at most 1 ppm, said method comprising:

arranging the carbon source, solvent metal and seed crystal in this order, adding a nitrogen getter which is at least one member selected from the group consisting of Group IVa and Va elements of the Periodic Table and an element capable of preventing formation of a carbide of at least one member selected from the group consisting of Group IVb and Vb elements of the Periodic Table to the solvent metal, the solvent metal including elements selected from the group consisting of Cu, Ag, Au, Zn or Cd, which elements are capable of preventing the formation of a carbide of a Group IVa or Va element of the Periodic Table, and arranging a buffer material for stabilizing initial growth of the crystal between the solvent metal and the surface of the seed crystal, and wherein the diamond is synthesized at a high pressure and temperature at which the diamond is stable in said temperature gradient method in an apparatus including a sample section wherein the diamond is synthesized under said high pressure and temperature, followed by lowering the temperature and pressure in the sample section to room temperature and pressure, and wherein the lowering of the pressure in said sample section is performed at a temperature of 300 to 1000° C.

* * * * *